United States Patent [19]

Beller et al.

[11] Patent Number: 5,203,729
[45] Date of Patent: Apr. 20, 1993

[54] AUGER-DRIVEN AMPHIBIOUS TOY

[76] Inventors: Larry D. Beller, P.O. Box 444, Homer, Ak. 99603; Douglas S. Hart; Robert L. White, both of P.O. Box 1775, Kenai, Ak. 99611

[21] Appl. No.: 819,091

[22] Filed: Jan. 9, 1992

Related U.S. Application Data

[63] Continuation-in-part of Ser. No. 510,971, Apr. 19, 1990. 1990.

[51] Int. Cl.[5] ............................................. B60F 3/00
[52] U.S. Cl. .................................. 440/48; 440/113; 446/154; 446/163; 114/270
[58] Field of Search .................... 440/48, 53, 80, 90, 440/98, 6, 113; 446/153, 154, 160, 163, 164, 165; 114/270

[56] References Cited

U.S. PATENT DOCUMENTS

| | | |
|---|---|---|
| 559,912 | 5/1896 | Stauber . |
| 941,923 | 11/1909 | Hoffman . |
| 3,181,272 | 5/1965 | Gibson . |
| 3,397,668 | 8/1968 | Mainguy . |
| 3,418,960 | 12/1968 | Nelson . |
| 3,422,790 | 1/1969 | Connell . |
| 4,213,270 | 7/1980 | Oda . |
| 4,270,307 | 6/1981 | Arigaya . |
| 4,358,280 | 11/1982 | Jeanson et al. . |
| 4,390,877 | 6/1983 | Curran . |
| 4,400,698 | 8/1983 | Wessels . |
| 4,457,101 | 7/1984 | Matsushiro . |
| 4,476,948 | 10/1984 | Komoto et al. . |
| 4,571,213 | 2/1986 | Ishimoto . |
| 4,577,528 | 3/1986 | Hanzawa . |
| 4,816,795 | 3/1989 | Suto . |
| 4,857,022 | 8/1989 | Slonim . |
| 4,902,260 | 2/1990 | Tao-Kyu Im . |

FOREIGN PATENT DOCUMENTS 2941246 4/1981 Fed. Rep. of Germany .

Primary Examiner—Jesus D. Sotelo
Assistant Examiner—Stephen P. Avila
Attorney, Agent, or Firm—Flehr, Hohbach, Test, Albritton & Herbert

[57] ABSTRACT

An auger-driven remotely controllable amphibious vehicle is disclosed. The vehicle includes a buoyant hull in the general configuration of a speedboat. An auger is mounted for rotation along each side of the vehicle. The generally cylindrical augers with helical screws are nested closely in approximately quarter-cylinder recesses formed along the lower sides of the hull at the waterline so that a considerable portion of the water moved by the augers is contained in the narrow spaces between the augers and the hull, and is then thrust directly rearward (or forward) for increased efficiency in propulsion. A propulsion mechanism and other components are preferably mounted in the center of the vehicle for balance. The vehicle preferably includes control apparatus and signal receiving apparatus for remote operation.

2 Claims, 1 Drawing Sheet

AUGER-DRIVEN AMPHIBIOUS TOY

This application is a continuation-in-part of Ser. No. 07/510,971, filed Apr. 19, 1990.

BRIEF DESCRIPTION OF THE INVENTION

The present invention relates to toy vehicles. More particularly, the present invention relates to an auger-driven amphibious toy vehicle which may be remotely controlled.

BACKGROUND OF THE INVENTION

Toy vehicles are known in the art. Remotely controllable toy vehicles are also known in the art. Amphibious toy vehicles which may be remotely controlled have also been developed. U.S. Pat. No. 4,270,307 discloses one such vehicle. This vehicle relies upon separate mechanisms for propulsion on land and water. On land, the disclosed vehicle uses a wheel assembly, while in water it utilizes a propeller assembly. These dedicated systems complicate the device. Another problem associated with this device is that the wheel assembly is not rugged enough to successfully drive the vehicle over difficult terrains such as mud, snow, and ice.

U.S. Pat. No. 4,902,795 discloses another remotely controllable amphibious vehicle. The device disclosed therein relies upon wheels for propulsion on both land and water. While this device does not have dedicated systems for water and land, the efficiency of the wheels in water is marginal.

OBJECTS AND SUMMARY OF THE INVENTION

It is a general object of the present invention to provide an amphibious toy that can be efficiently propelled through water and over land.

It is a more particular object of the present invention to provide an amphibious toy that is remotely controllable.

It is a related object of the present invention to provide a remotely controllable amphibious toy that utilizes a single, efficient mechanism for propulsion on both land and water.

It is a further object of this invention to provide a remotely controllable amphibious toy that can be driven through water, as well as over mud, snow, ice, and dry ground.

These and other objects are achieved by an auger-driven amphibious vehicle. The vehicle includes a buoyant hull in the general configuration of a speedboat. An auger is mounted for rotation along each side of the craft. The generally cylindrical augers with helical screws are nested closely in approximately quarter-cylinder recesses formed along the lower sides of the hull at the waterline so that a considerable portion of the water moved by the augers is contained in the narrow spaces between the augers and the hull, and is then thrust directly rearward (or forward) for increased efficiency in propulsion. The battery and other components are preferably mounted in the center of the vehicle for balance. The vehicle preferably includes control means and signal receiving means for remote operation.

BRIEF DESCRIPTION OF THE DRAWINGS

For a better understanding of the nature and objects of the invention, reference should be had to the following detailed description taken in conjunction with the accompanying drawings, in which.

Like reference numerals refer to corresponding parts throughout the several views of the drawings.

DETAILED DESCRIPTION OF THE INVENTION

Figure 1:
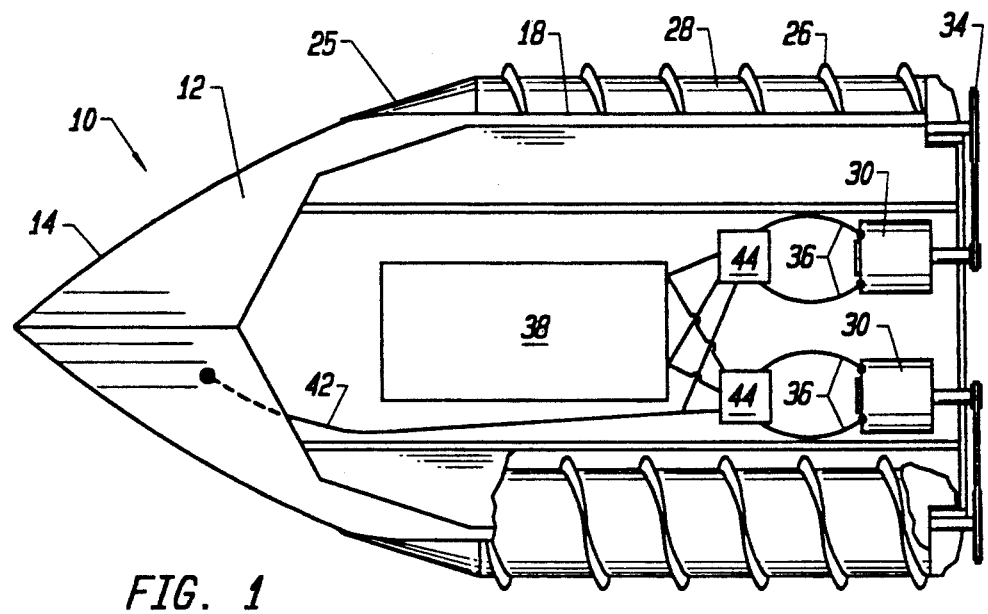
FIG. 1 is top, partially broken-away, view of the remote amphibious toy of the present invention.
Figure 2:
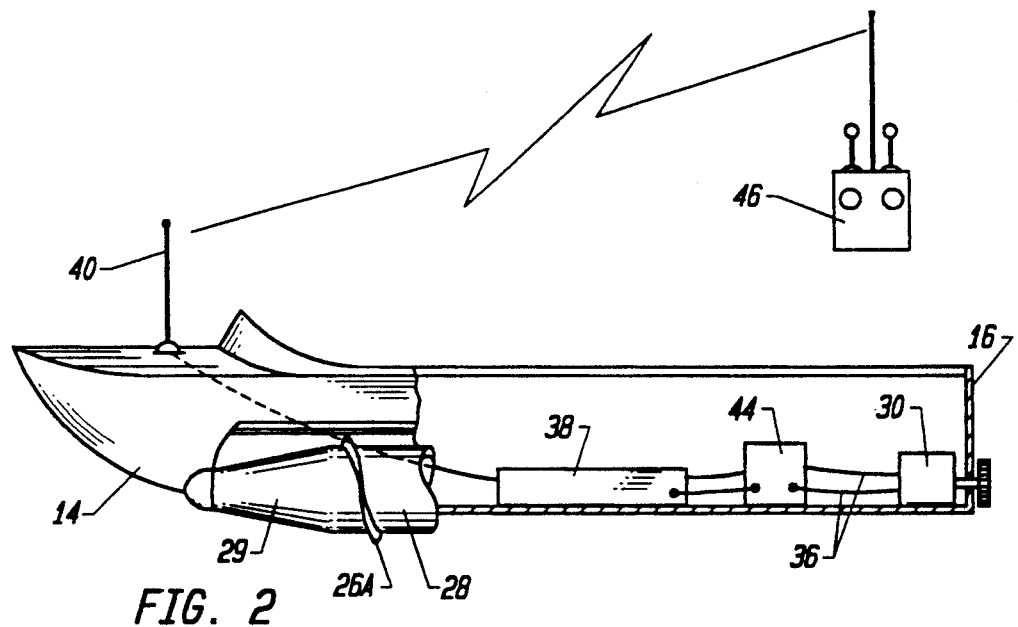
FIG. 2 is a side, partially broken-away, view of the remote amphibious toy of the present invention.
Figure 3:
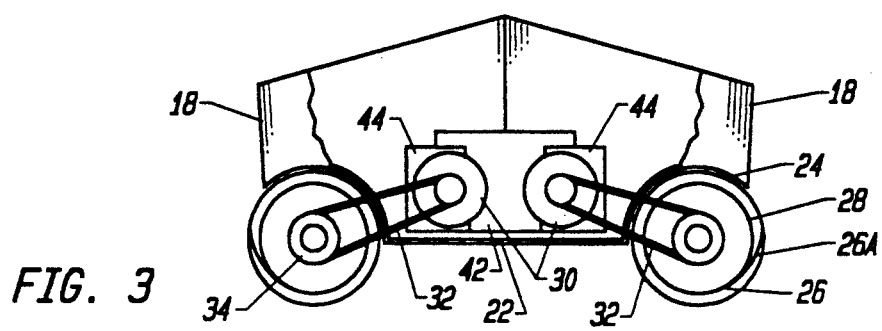
FIG. 3 is a rear view which shows the propelling augers of the remote amphibious toy of the present invention.

Referring to FIGS. 1 and 2, the amphibious toy 10 of the present invention has a buoyant hull 12 having a bow 14, a stern 16, and sides 18. Turning to FIG. 3, the hull 12 near the stern 16 of the amphibious toy 10 may be relatively flat. Between the sides 18 and the hull 12 at the stern 16 of the amphibious toy 10 are internal cylindrical recesses or transition surfaces 24. The cylindrical recesses or transition surfaces 24 preferably extend through at least ninety degrees, and preferably, are approximately 120 degrees. Closely received in the cylindrical recesses 24 are oppositely wound screw threads 26 positioned on generally cylindrical augers 28. With this arrangement, a substantial percentage of the water moved by the screws is contained within the cylindrical transition surfaces 24 between the screw threads 26, and is thrust directly to the rear for a more efficient forward thrust.

Preferably, there is approximately a one-quarter inch clearance between the cylindrical transition surfaces 24 and the screw threads 26 of cylindrical augers 28. Preferably, the augers 28 taper down at their forward ends 29 to a nearly conical configuration, as seen in FIGS. 1 and 2.

The helical screw threads 26 and augers 28 may be formed of steel, aluminum, fiberglass, or plastic. The augers 28 may be hollow or filled with a buoyant material. The threads 26 are preferably approximately perpendicular to the surface of the cylindrical cores 28. For straight travel, either forward or in reverse, the augers 26 are driven in opposite rotary directions. For turning, one auger 26 may be slowed, stopped or even reversed. Thus, the amphibious vehicle 10 can be effectively propelled in any direction. The threads 26 form very effective "cleats" for travel over any surface, whether marshalling, snow, ice, or mud.

The augers 28 may be driven by electric motors 30 through torque belts 32 and sprockets 34. The electric motors 30 are driven by an appropriate battery 38. In the alternative, the electric motors 30 may be in axial alignment with the augers 28 for direct drive of the augers 28. For instance, the electric motors 30 may be mounted at the stern 16, in either an inboard or outboard arrangement.

Remote control means 46 are provided to supervise the operation of the toy. Remote control means 46 sends a signal to the receiving antenna 40. Antenna 40 is coupled to signal processing means 44 which controls the operation of the electric motors 30. Operation of remote control means 46 in conjunction with signal processing means 44 and electric motors 30 is disclosed in U.S. Pat. Nos. 4,270,307 and 4,902,260, these patents are expressly incorporated by reference herein.

A less sophisticated drive mechanism may also be used in accordance with the invention. For instance, the motors 30 and battery 38 may be substituted with a manual winding mechanism, of the type known in the art. The winding mechanism would then drive the augers 28.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An amphibious toy vehicle comprising:
a central vessel including a buoyant hull and generally upright sides;
a pair of augers with oppositely wound threads rotatably mounted along said sides of said hull, each of said augers extending below said hull;
means for propelling said augers;
remote control means for sending a control signal;
signal receiving means mounted in said vessel for receiving said control signal; and
signal processing means coupled to signal receiving means for utilizing said control signal for operating said propelling means.

2. An amphibious toy vehicle comprising:
a central vessel including a bottom and a generally upright first side and a generally upright second side, said first side merging with said bottom to form a first transition recess surface, said second side merging with said bottom to form a second transition recess surface;
a first auger rotatably mounted adjacent to said first transition recess surface and extending below said bottom, said first auger being of a generally cylindrical configuration and having a continuous, helical thread extending in a first direction along a substantial portion of the length of said first auger;
a second auger rotatably mounted adjacent to said second transition recess surface and extending below said bottom, said second auger being of a generally cylindrical configuration and having a continuous, helical thread extending in a second direction, opposite said first direction, along a substantial portion of the length of said first auger;
means coupled to said first auger and said second auger for propelling said first auger and said second auger;
remote control means for sending a control signal;
signal receiving means mounted in said vessel for receiving said control signal; and
signal processing means coupled to signal receiving means for utilizing said control signal for operating said propelling means.

* * * * *